(12) United States Patent
Thomas et al.

(10) Patent No.: US 8,940,165 B2
(45) Date of Patent: Jan. 27, 2015

(54) OIL-FILTER DEVICE

(71) Applicant: Bayerische Motoren Werke Aktiengesellschaft, Munich (DE)

(72) Inventors: Daniel Thomas, Kirchheim (DE); Benjamin Schuck, Senden (DE); Christian Duecker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/655,820

(22) Filed: Oct. 19, 2012

(65) Prior Publication Data

US 2013/0037478 A1  Feb. 14, 2013

Related U.S. Application Data

(63) Continuation of application No. PCT/EP2011/001069, filed on Mar. 4, 2011.

(30) Foreign Application Priority Data

Apr. 21, 2010  (DE) .......................... 10 2010 015 677

(51) Int. Cl.
  *B01D 35/16*  (2006.01)
  *F01M 11/03*  (2006.01)
  *B01D 29/21*  (2006.01)
  *B01D 29/96*  (2006.01)
  *F01M 1/10*  (2006.01)

(52) U.S. Cl.
  CPC ................ *F01M 11/03* (2013.01); *B01D 35/16* (2013.01); *B01D 29/21* (2013.01); *B01D 29/96* (2013.01); *B01D 2201/24* (2013.01); *B01D 2201/296* (2013.01); *B01D 2201/306* (2013.01); *F01M 2001/1064* (2013.01)
  USPC ............................ 210/233; 210/248; 210/454

(58) Field of Classification Search
  CPC ............................. B01D 35/16; F01M 11/03
  USPC ......... 210/167.02, 171, 172.3, 233, 248, 454, 210/459, 493.2, 497.01; 184/1.5, 6.24, 106; 123/196 A; 285/80
  See application file for complete search history.

(56) References Cited

U.S. PATENT DOCUMENTS 2,372,286 A * 3/1945 Mieras ..................... 210/167.09
2,524,336 A  10/1950 C. G. Vokes
2,887,229 A * 5/1959 Schleicher et al. ........... 210/171

(Continued)

FOREIGN PATENT DOCUMENTS

DE  1 835 652 U  7/1961
DE  29 32 453 A1  2/1980

(Continued)

OTHER PUBLICATIONS

German Search Report dated Jan. 14, 2011 with partial English translation (nine (9) pages).

(Continued)

*Primary Examiner* — Matthew O Savage
(74) *Attorney, Agent, or Firm* — Crowell & Moring LLP

(57) ABSTRACT

An oil-filter device, in particular for a motor-vehicle internal combustion engine, includes a filter element and a cover region. An oil outlet, which is closed by a destructible single-use closure, is provided in the cover region of the oil-filter device.

11 Claims, 3 Drawing Sheets

(56) References Cited

U.S. PATENT DOCUMENTS

| | | | | |
|---|---|---|---|---|
| 3,211,256 | A | * | 10/1965 | Teutsch .................... 184/106 |
| 3,211,291 | A | * | 10/1965 | Teutsch ................... 210/172.3 |
| 3,334,775 | A | * | 8/1967 | Klein et al. ................ 220/268 |
| 3,773,144 | A | * | 11/1973 | Hummel .................... 184/6.24 |
| 3,912,633 | A | * | 10/1975 | Delaney .................. 210/167.02 |
| 4,177,529 | A | | 12/1979 | Sikula, Jr. |
| 4,237,015 | A | * | 12/1980 | Fearnhead ................. 210/444 |
| 4,676,281 | A | | 6/1987 | Nord |
| 4,744,328 | A | * | 5/1988 | Stevens et al. ............. 116/200 |
| 4,851,116 | A | * | 7/1989 | Tomita ...................... 210/222 |
| 5,044,531 | A | | 9/1991 | Rhodes, Jr. |
| 5,421,223 | A | | 6/1995 | Wawrzyniak |
| 5,546,979 | A | | 8/1996 | Clark, II et al. |
| 5,588,140 | A | | 12/1996 | Misukanis et al. |
| 6,199,578 | B1 | | 3/2001 | Clark, II |
| 6,585,889 | B2 | * | 7/2003 | Weingaertner ............ 210/172.2 |
| 6,616,838 | B1 | | 9/2003 | Harris |
| 6,672,932 | B1 | * | 1/2004 | Panec et al. .................... 446/185 |
| 2005/0257766 | A1 | * | 11/2005 | Rau et al. .................. 123/195 C |
| 2006/0118476 | A1 | | 6/2006 | Weindorf et al. |

FOREIGN PATENT DOCUMENTS

| | | |
|---|---|---|
| DE | 39 03 675 A1 | 8/1990 |
| DE | 10 2004 058 885 A1 | 6/2006 |
| EP | 0 216 778 B1 | 1/1989 |

OTHER PUBLICATIONS

International Search Report dated Jun. 6, 2011 with English translation (6 pages), for PCT/EP2011/001069.

German Search Report dated Jan. 14, 2011 with partial English translation (9 pages), for DE 10 2010 015 677.9.

* cited by examiner

OIL-FILTER DEVICE

CROSS REFERENCE TO RELATED APPLICATIONS

This application is a continuation of PCT International Application No. PCT/PCT/EP2011/001069, filed Mar. 4, 2011, which claims priority under 35 U.S.C. §119 from German Patent Application No. 10 2010 015 677.9, filed Apr. 21, 2010, the entire disclosures of which are herein expressly incorporated by reference.

BACKGROUND AND SUMMARY OF THE INVENTION

The invention relates to an oil filter device, which is intended, in particular, for the internal combustion engine of a motor vehicle and includes a filter element and a cover region.

Oil filters are used for cleaning the lubricating oil of internal combustion engines of motor vehicles. A conventional oil filter is disclosed, for example, in DE 39 03 675 A1. This oil filter has an annular filter insert, which is disposed in a pot-shaped filter housing, includes a plurality of separate components and is fitted in the region of the periphery of the internal combustion engine.

The lubricating oil of the internal combustion engine of motor vehicles has to be changed at regular intervals. At the same time it is often the case that the filter insert also has to be changed, in particular, in motor vehicles. In the case of a conventional oil filter, such as the oil filter disclosed in DE 39 03 675 A1, the filter insert in the filter housing is changed, whereas the oil is drained at a different location, typically by way of an oil drain orifice in the area of an oil pan. Such a conventional oil drain device for oil pans of internal combustion engines of motor vehicles is known from DE 1 835 652 U.

Consequently, an oil change requires that several working steps have to be performed at a number of different locations. The old oil has to be drained at the oil pan; the oil filter has to be changed in the region of the periphery of the internal combustion engine; the oil drain orifice has to be closed again; and in so doing, a closure element has to be cleaned and provided with a new sealant; and fresh oil has to be filled in through the oil filling orifice. Inherent in such an oil change is the need for a not insignificant amount of installation space as well as an increase in weight, an increase in costs and an increase in the service costs.

Therefore the object of the present invention is to provide an aforementioned oil filter device that needs less installation space, has less weight, is more cost efficient and facilitates a simplified oil change.

This and other objects are achieved with an oil filter device that is intended, in particular, for the internal combustion engine of a motor vehicle and includes a filter element and a cover region. An oil drain is provided which is closed by a destructible single use closure, in the cover region of the oil filter device. This feature makes it possible to drain the old oil at the oil filter device itself, so that the working steps required for an oil change can be performed in a spatially concentrated manner.

In the oil filter device according to one aspect of the invention, the cover region and the single use closure are manufactured preferably in one piece as a common component, and a predetermined break point is provided between the cover region and the single use closure. As a result, the cover region with the oil drain and the single use closure have a very simple engineering design, and the cover region can be manufactured at a very low cost.

It is very advantageous for the single use closure to exhibit a first geometry for mechanical engagement ("engagement geometry") for removing the single use closure. This feature makes it possible to remove the single use closure by, for example, hand, and, if necessary, with the aid of a suitable tool, but at the same time an automatic removal is also possible.

It is preferred that the cover region have a connection geometry for connecting the oil filter device to a corresponding connection geometry of an oil reservoir, so that the oil filter device can be connected to the oil reservoir in a detachable and simultaneously oil-tight manner.

In addition, it is also considered to be advantageous for the cover region of the oil filter device to have a second engagement geometry for inserting and/or removing the oil filter device. As a result, the oil filter device can be inserted and/or removed, for example, by hand and, if necessary, with the aid of a suitable tool, but an automated insertion and/or removal is also possible.

A practical embodiment provides that the cover region is chamfered on the inner side in the direction of the oil drain, in order to ensure that when the old oil is drained, this oil will drain as quickly and completely as possible.

According to an especially preferred exemplary embodiment, the oil filter device according to the invention has bypass orifices for draining old oil by bypassing the filter element. The advantage of this feature is that when the old oil is drained, it does not have to flow through the filter element.

It is very advantageous for the cover region to exhibit a region that is designed in the form of a pointed hood on the axially inner side and to include the bypass orifices. This feature, too, facilitates a drainage that is as fast and as complete as possible when draining the old oil.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
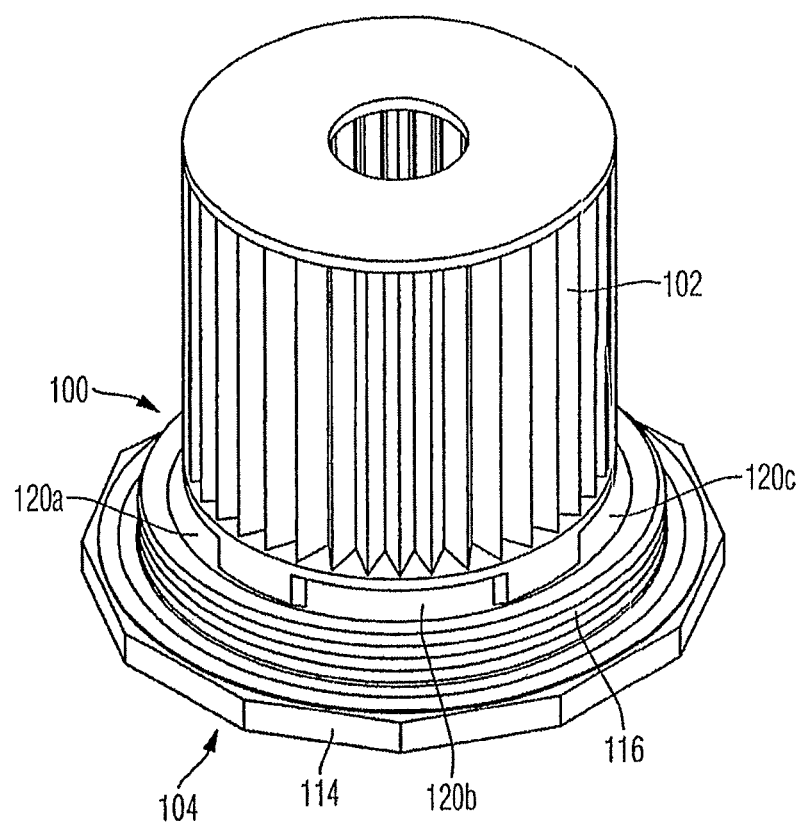
FIG. 1 shows an oil filter device that is intended for an internal combustion engine of a motor vehicle and includes a filter element and a cover region with an oil drain and a single use closure in an isometric view seen obliquely from above.
Figure 2:
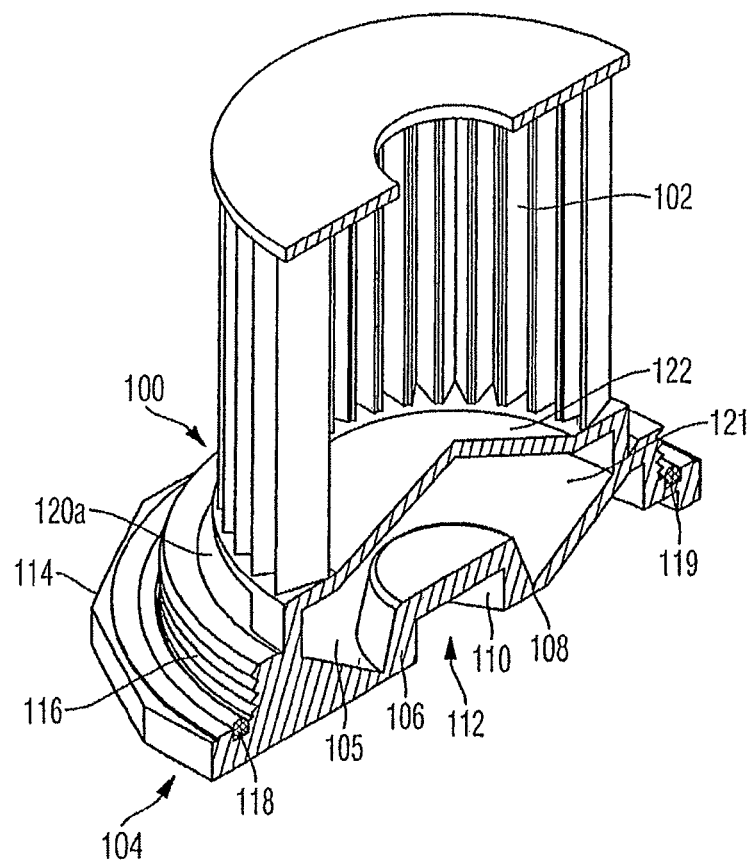
FIG. 2 shows an oil filter device that is intended for an internal combustion engine of a motor vehicle and includes a filter element and a cover region with an oil drain and a single use closure in a sectional view.
Figure 3:
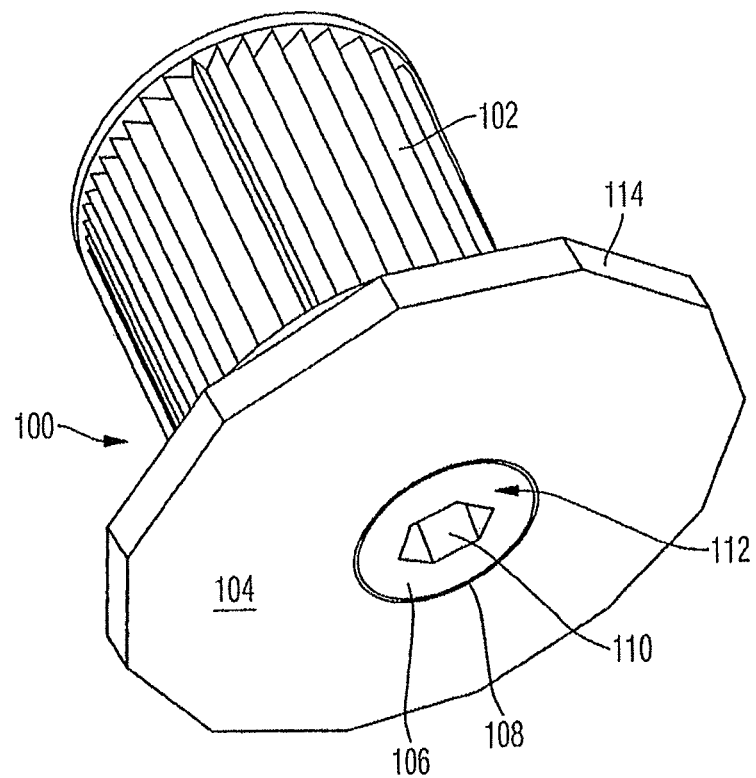
FIG. 3 shows an oil filter device that is intended for an internal combustion engine of a motor vehicle and includes a filter element and a cover region with an oil drain and a single use closure in an isometric view seen obliquely from below.

FIG. 1 shows an oil filter device 100 that is intended for an internal combustion engine of a motor vehicle and includes a filter element 102 and a cover region 104 with an oil drain 112 (see FIGS. 2 and 3) and a single use closure 106 in an isometric view seen obliquely from above. FIG. 2 shows an oil filter device 100 in a sectional view, and an isometric view seen obliquely from below is shown in FIG. 3.

In the oil filter device 100, the filter element 102, the cover region 104 and the oil drain 112 are jointly constructed.

The cover region 104 of the oil filter device 100 is made preferably of a synthetic plastic material. For example, the cover region 104 is a plastic injection molded part made of a thermoplastic and, if desired, fiber reinforced. As an alternative, the cover region 104 can also be manufactured as a sheet metal component made, for example, of an aluminum alloy, or it can contain both metal and plastic.

The cover region 104 is designed in the shape of a disk and has an inwards projecting collar with a connection geometry 116 for connecting the oil filter device 100 to a corresponding connection geometry of an oil reservoir. In the present embodiment the connection geometry 116 is an external thread, by means of which the oil filter device 100 can be screwed into an orifice of an oil reservoir, such as, in particular, an oil pan, which has a corresponding internal thread. As an alternative, the connection geometry 116 can be, for example, a part of a bayonet lock.

Then, a groove 118 for receiving a seal is provided on the radially outer side of the collar exhibiting the connection geometry 116. In the present embodiment the groove 118 serves to receive a conventional O-ring seal 119, which seals in an oil-tight manner between the oil filter device 100 and the oil reservoir, when the oil filter device 100 is connected to the oil reservoir. Situated radially further on the outer side, the cover region 104 has an engagement geometry 114 for a tool for inserting and/or removing the oil filter device 100. In the illustrated exemplary embodiment the engagement geometry 114 is constructed as a dodecagon. However, the engagement geometry 114 can also have any other useful shape. As an alternative or in addition, the engagement geometry 114 can also be suitable for a manual operation without a tool. For example, the engagement geometry 114 can be a knurled surface.

The cover region 104 has a region 122 that is designed in the form of a pointed hood (having a generally conical or convex region) on the axially inner side of the connection geometry 116 and has bypass orifices 120a, 120b, 120c for draining the old oil by bypassing the filter element 102. The region 122 that is designed in the form of a pointed hood covers a chamber 121, to which the bypass orifices 120a, 120b, 120c form an access.

The filter element 102 is connected to the cover region 104 on the radially inner side of the collar exhibiting the connection geometry 116 and axially inside the bypass orifices 120a, 120b, 120c. The filter element 102 is designed, as usual, in the shape of a hollow cylinder or a ring, and its end that faces away from the cover region 104 is enclosed with a plastic part designed in the shape of an annular disk. As an alternative, this component can also be made of any other suitable material—for example, sheet metal—or, being integrated without a separate component in the filter element 102, can be made, as currently also a part of the prior art, of the same material as the filter itself (compressed, oil-tight non-woven filter fabric). In the present embodiment the filter element 102 is permanently cast with or adhesively cemented to the cover region 104 and the plastic part shaped in the manner of an annular disk.

The cover region 104 has an oil drain 112 on the radial inner side of the filter element 102, and this oil drain is closed with a destructible single use closure 106. In the present embodiment the oil drain 112 having a single use closure 106 is implemented in that the cover region 104 has a predetermined break point 108 between the closure 106 and the additional cover region 104.

The predetermined break point 108 is designed such that when the motor vehicle is running, the closure 106 closes reliably and tightly, but is detachable for an oil change. The predetermined break point is formed by an internal and/or external weak spot formed in the cover region 104. In the present embodiment a weak spot in the shape of an annular groove is provided on the outside of the cover region 104 in order to form the predetermined break point 108. On the inside the cover region 104 is provided with a funnel-shaped region 105 that facilitates the formation of the predetermined break point 108 and, at the same time, ensures that the oil reservoir will empty smoothly and completely when the oil drain 112 is open. The funnel-shaped region 105 extends over nearly the total thickness of the cover region 104. The oil drain 112 has a defined orifice area, so that when draining the oil, a defined flow rate is guaranteed. The predetermined break point 108 can also have a different shape, for example an oval or polygonal shape.

The outer side of the single use closure 106 has an engagement geometry 110 for a tool for removing the closure 106. In the illustrated exemplary embodiment this engagement geometry 110 is configured as a hexagonal socket. However, the engagement geometry 110 can also exhibit any other useful shape, such as a Torx, slot or cross slot. As an alternative or in addition, the engagement geometry 110 can also lend itself to a manual operation without a tool. For example, the engagement geometry 110 can be a pull-off ring.

A suitable tool can be applied to the engagement geometry 110 for an oil change, and the closure 106 can be unscrewed or broken out, so that old oil can run through the bypass orifices 120a, 120b, 120c and into the chamber 121 and can drain through the oil drain 112. In so doing, a complete drainage of the old oil is promoted by the chamfer of the region surrounding the oil drain 112 and by the pointed hood-shaped design of the region 122.

Then, a suitable tool can be applied to the engagement geometry 114, and the oil filter device 100 can be removed from the oil reservoir. The old oil filter device 100 is disposed of, and a new oil filter device 100 is inserted using the suitable tool. The oil drain 112 of the new oil filter device is closed with a closure 106, which is prefabricated cleanly and with a new seal. Finally, new oil is filled into the oil reservoir.

It is especially advantageous to use the oil filter device 100 when the filter element 102 is assigned to the intake side of an oil pump, because then the filter element 102 can perform additionally a safety function for the oil pump, so that there is no need for a separate intake protection filter.

The oil filter device 100 advantageously eliminates the past requirement of cleaning and inserting again an oil-fouled oil drain screw with a new seal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oil filter device, comprising:
   a filter element;
   a cover operatively configured with the filter element and including a connection geometry operatively configured for connecting the oil filter device to a corresponding connection geometry of an oil reservoir; and
   a destructible single use closure element operatively configured to close an oil drain formed in the cover and having a structure that breaks apart from the cover when the single use closure element is opened;
   wherein the single use closure element is disposed entirely inside the oil filter device, except for an outer surface of the single use closure element that is flush with an outer surface of the cover, and the single use closure element is radially inward from the connection geometry;

wherein the cover and the single use closure element are formed in one piece as a common component, and a predetermined break point is provided between the cover and the single use closure element; and wherein the cover includes one or more bypass orifices operatively located to allow oil to bypass the filter element when exiting the oil drain, the bypass orifices being located radially outward from the single use closure element and having an orientation that allows the oil to flow radially inward through the bypass orifices, and the bypass orifices being located at an elevation between a lower end of the filter element and an upper end of the connection geometry.

2. The oil filter device according to claim 1, wherein the oil filter device is operatively configured for use with an internal combustion engine of a motor vehicle.

3. The oil filter device according to claim 2, wherein the single use closure element has a first engagement geometry operatively configured to facilitate removal of the single use closure element from the cover to open the oil drain.

4. The oil filter device according to claim 3, wherein the cover comprises a second engagement geometry operatively configured to facilitate at least one of insertion and removal of the oil filter device.

5. The oil filter device according to claim 3, wherein the cover has a chamfered surface on an inner side, the chamfered surface extending in a direction of the oil drain.

6. The oil filter device according to claim 1, wherein the single use closure element has a first engagement geometry operatively configured to facilitate removal of the single use closure element from the cover to open the oil drain.

7. The oil filter device according to claim 6, wherein the cover comprises a second engagement geometry operatively configured to facilitate at least one of insertion and removal of the oil filter device.

8. The oil filter device according to claim 1, wherein the cover has a chamfered surface on an inner side, the chamfered surface extending in a direction of the oil drain.

9. The oil filter device according to claim 1, wherein an axially inner side of the cover comprises a region having a pointed hood shape and comprising the bypass orifices.

10. The oil filter device according to claim 9, wherein the cover comprises a chamber arranged between the pointed hood region and the chamfered surface, the oil drain being located in a wall of the chamber.

11. The oil filter device according to claim 1, wherein the cover includes a funnel-shaped region inside the cover between the bypass orifices and the closure element, the funnel-shaped region having a surface that is angled downward toward the outer surface of the cover between the bypass orifices and the closure element.

* * * * *